United States Patent [19]
Yamamoto

[11] Patent Number: 6,126,335
[45] Date of Patent: Oct. 3, 2000

[54] FILM HOLDER AND IMAGE READING DEVICE

[75] Inventor: Yasuhiro Yamamoto, Tokyo, Japan

[73] Assignee: Asahi Kogaku Kogyo Kabushiki Kaisha, Tokyo, Japan

[21] Appl. No.: 09/088,711

[22] Filed: Jun. 2, 1998

[30] Foreign Application Priority Data

Jun. 4, 1997 [JP] Japan .................................. P09-161900
Jun. 4, 1997 [JP] Japan .................................. P09-161901

[51] Int. Cl.[7] .............................. G03B 17/26; H04N 1/04; H04N 5/253; B65H 20/00
[52] U.S. Cl. .......................... 396/511; 358/487; 358/493; 348/96; 226/120
[58] Field of Search ..................................... 396/511, 598, 396/599, 640, 642, 647, 649, 650, 651, 652, 653; 358/487, 493; 355/47, 48, 49, 75; 348/96; 353/DIG. 2; 226/158, 120, 200

[56] References Cited

U.S. PATENT DOCUMENTS

| | | | |
|---|---|---|---|
| 3,719,130 | 3/1973 | Scott, Jr. | 396/511 X |
| 4,440,491 | 4/1984 | Takahama | 355/75 |
| 4,943,853 | 7/1990 | Morisawa | 396/429 |
| 5,678,101 | 10/1997 | Mogamiya et al. | 348/110 |
| 5,933,222 | 8/1999 | Hoshino et al. | 355/75 |
| 5,984,538 | 11/1999 | Sherburne et al. | 396/598 |

*Primary Examiner*—W. B. Perkey
*Attorney, Agent, or Firm*—Greenblum & Bernstein, P.L.C.

[57] ABSTRACT

The film holder comprises a plurality of holder elements. Adjacent holder elements are connected to each other by a pin, so that the holder elements can be pivoted. A film engaging groove is formed on a side of each of the holder elements. The film engaging grooves are aligned with each other such that a peripheral edge of the film is engaged. The holder elements being rotatable while the film engaging grooves maintain a curvilinear alignment, allows the film to be smoothly curved, and the size of the image reading device, to which the film holder is mounted, to be reduced.

19 Claims, 8 Drawing Sheets

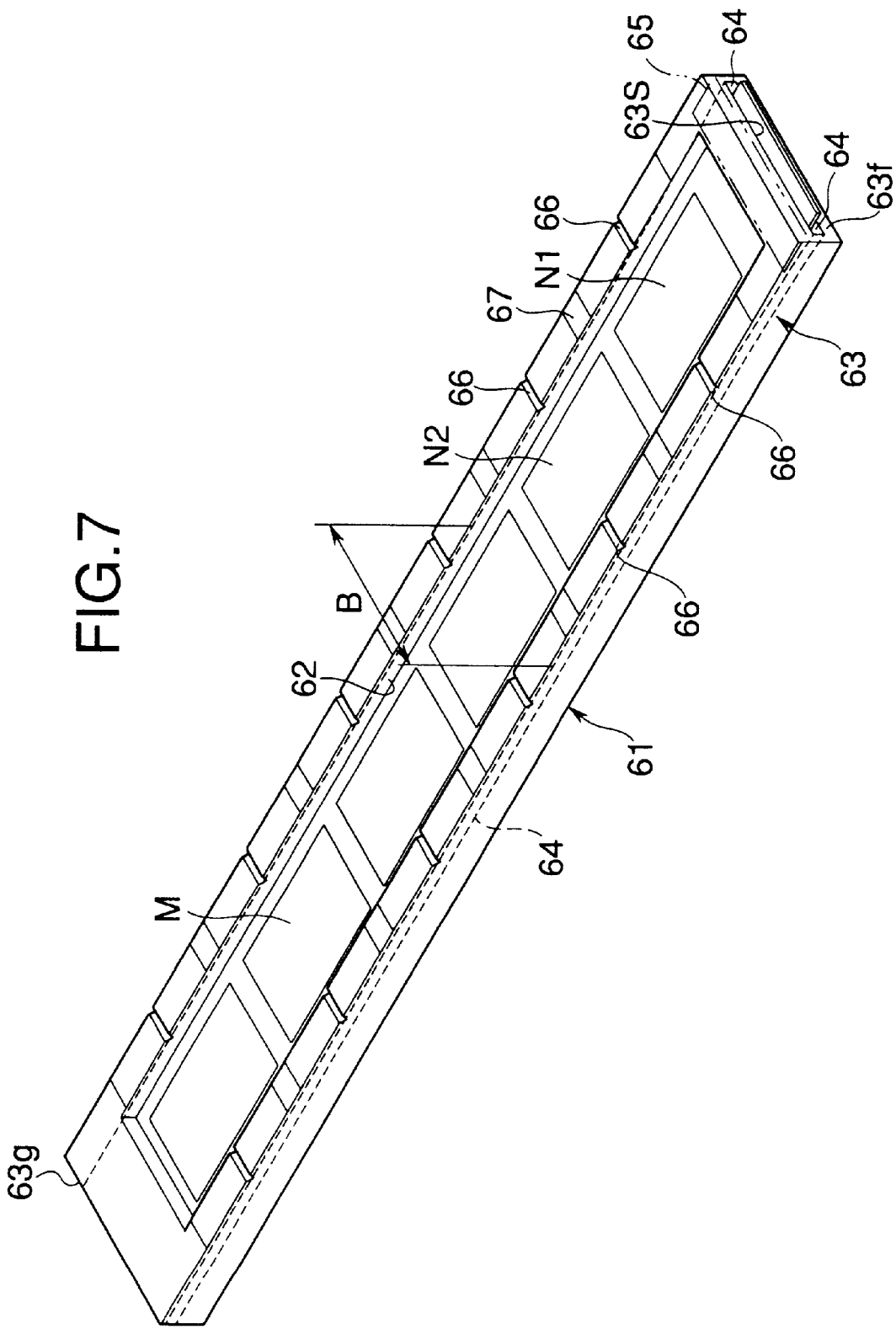

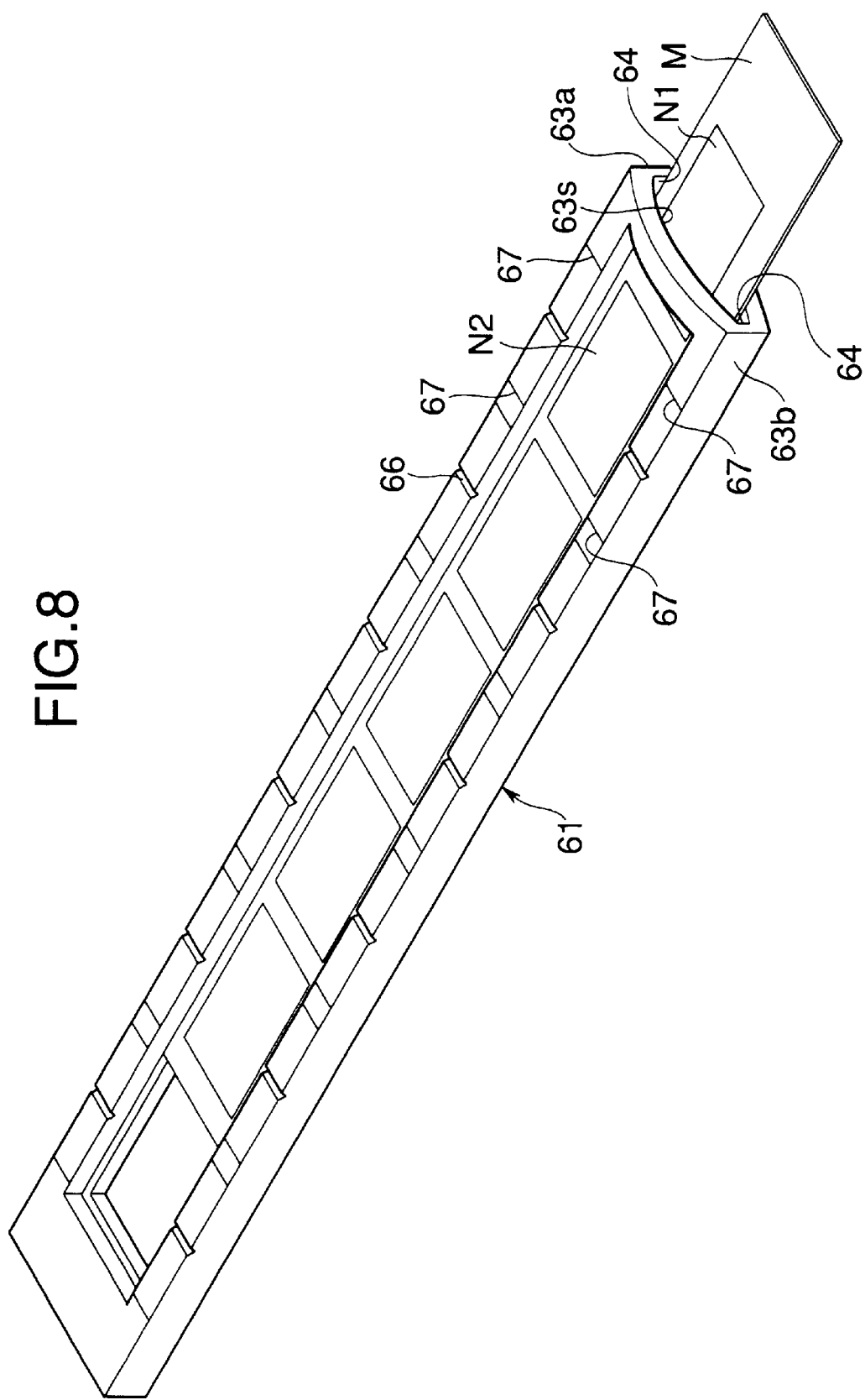

FILM HOLDER AND IMAGE READING DEVICE

BACKGROUND OF THE INVENTION

1. Field of the Invention

The present invention relates to a film holder, provided in an image reading device, in which an image, recorded in a film held by the film holder, is read.

2. Description of the Related Art

Conventionally, there is known an image reading device in which a stage is movably disposed between a light source and a line sensor, with a flat film holder, in which a film is held, being mounted on the stage, so that an image recorded in the film is read by the line sensor via a movement of the stage. Namely, the image is illuminated by the light source, and the light passing through the film is received by the line sensor to detect the image.

The film holder is slender so that a film strip, in which 6 images, for example, are recorded, can be attached to the film holder. A conventional image reading device which is constructed in such a manner that a film holder can be mounted therein, however, is required to be large enough to enable the film holder to be moved, since all of the images must be located at a position where each of the images can be read.

Further, even if the film holder is slender, a relatively large space is needed, so that the film holder can be housed therein when not being used.

SUMMARY OF THE INVENTION

Therefore, an object of the present invention is to provide a film holder which does not require a large space to stow the film holder, and thus enables the size of an image reading device, which can read a film strip, to be reduced.

According to the present invention, there is provided a film holder by which a film is held, comprising a plurality of holding elements and a connecting mechanism.

Each of the plurality of holding elements includes a film engaging groove with which a peripheral edge of the film can be engaged. The connecting mechanism pivotally connects each of the holding elements, which are adjacent to each other, in such a manner that, when the plurality of holding elements are pivoted, the film engaging grooves maintain a curvilinear alignment.

Further, according to the present invention, there is provided a film holder by which a film is held, comprising a holding member, which has a through-opening, by which a film is exposed, and a pair of film engaging grooves, with which peripheral edges of the film can be engaged. At least a part of the holding member is formed from a flexible material.

Another object of the present invention is to provide an image reading device in which the film holder is mounted.

According to the present invention, there is provided an image reading device comprising a holder guide, an illumination optical system and a reading optical system. The holder guide supports a film holder, in which a film is mounted, in such a manner that the film holder is curved. The illumination optical system radiates a light beam onto the film. The reading optical system reads an image recorded in the film, which is illuminated by the illumination optical system. One of the illumination optical system and the reading optical system is provided in a portion in which the center of curvature of the holder guide is positioned.

BRIEF DESCRIPTION OF THE DRAWINGS

The present invention will be better understood from the description of the preferred embodiments of the invention set forth below, together with the accompanying drawings, in which:

FIG. 7 is a perspective view showing the film holder of the second embodiment; and FIG. 8 is a perspective view showing the film holder of FIG. 7 in which a film inlet is open.

DESCRIPTION OF THE PREFERRED EMBODIMENTS

Figure 1:
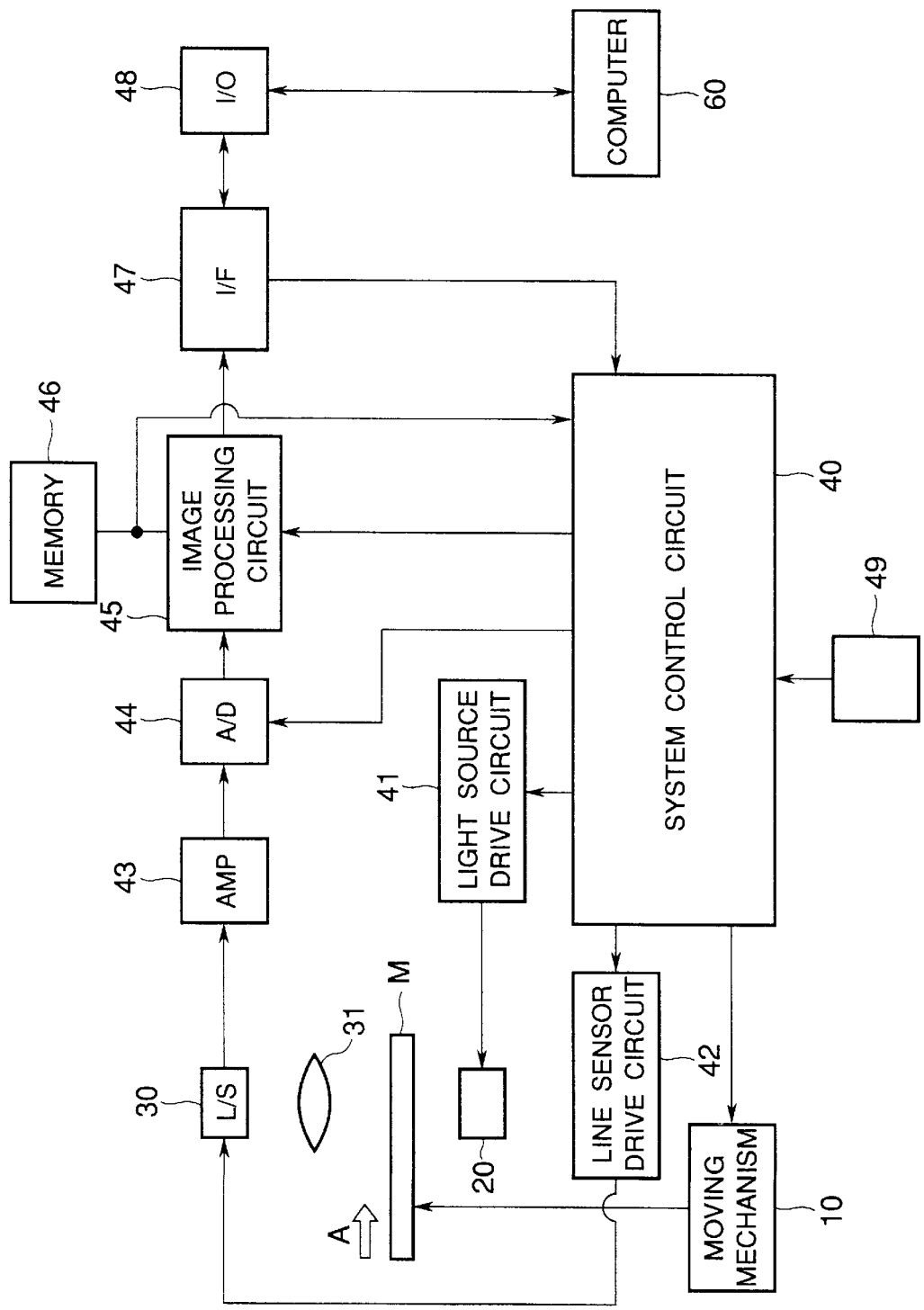
FIG. 1 is a block diagram showing an image reading device in which a film holder of a first or second embodiment of the present invention is mounted.

The present invention will be described below with reference to embodiments shown in the drawings.

FIG. 1 shows an electrical structure of an image reading device in which a film holder of a first or second embodiment of the present invention is mounted.

A film M, handled by this image reading device, is a transparent film on which a color image, for example, has been recorded. The film M is intermittently moved, by a moving mechanism 10, in a direction shown by an arrow A.

A light source 20 is disposed below a path along which the film M is moved. A line sensor 30 and a forming lens 31, provided below the line sensor 30, are disposed above the path. The light source 20 is connected to a light source drive circuit 41, so that the light source 20 can be turned ON and OFF. The line sensor 30 is connected to a line sensor drive circuit 42, so that the color image can be read by the line sensor 30. The moving mechanism 10, the light source drive circuit 41 and the line sensor drive circuit 42 are controlled in accordance with a command signal outputted by a system control circuit 40.

The line sensor 30 is provided with a plurality of photo-diodes, which are aligned rectilinearly, whereby an electric signal, corresponding to the amount of light received by the photo-diode, is generated in each of the photo-diodes. The electric signal (i.e. pixel data), read through the line sensor 30, is amplified by an amplifier 43 and is converted to a digital signal by an A/D converter 44. The digital image data is subjected to an image process, such as a shading correction, in an image processing circuit 45, and is then stored in a memory 46.

The pixel data, subsequent to being read from the memory 46, is subjected to various correction processes, such as a color correction and a gamma correction, in the image processing circuit 45. Then, the pixel data is converted to a signal, which conforms to a predetermined format, by an interface circuit 47, and is outputted to an external computer (i.e. an image processing device) 60 through an input/output terminal 48. The image processing circuit 45 and the interface circuit 47 are controlled by the system control circuit 40.

In this embodiment, although all of the operations can be controlled by the external computer 60, a switch 49 may be connected to the system control circuit 40, so that various operations can be directly performed, such as reading the image recorded on the film M, for example.

Figure 2:
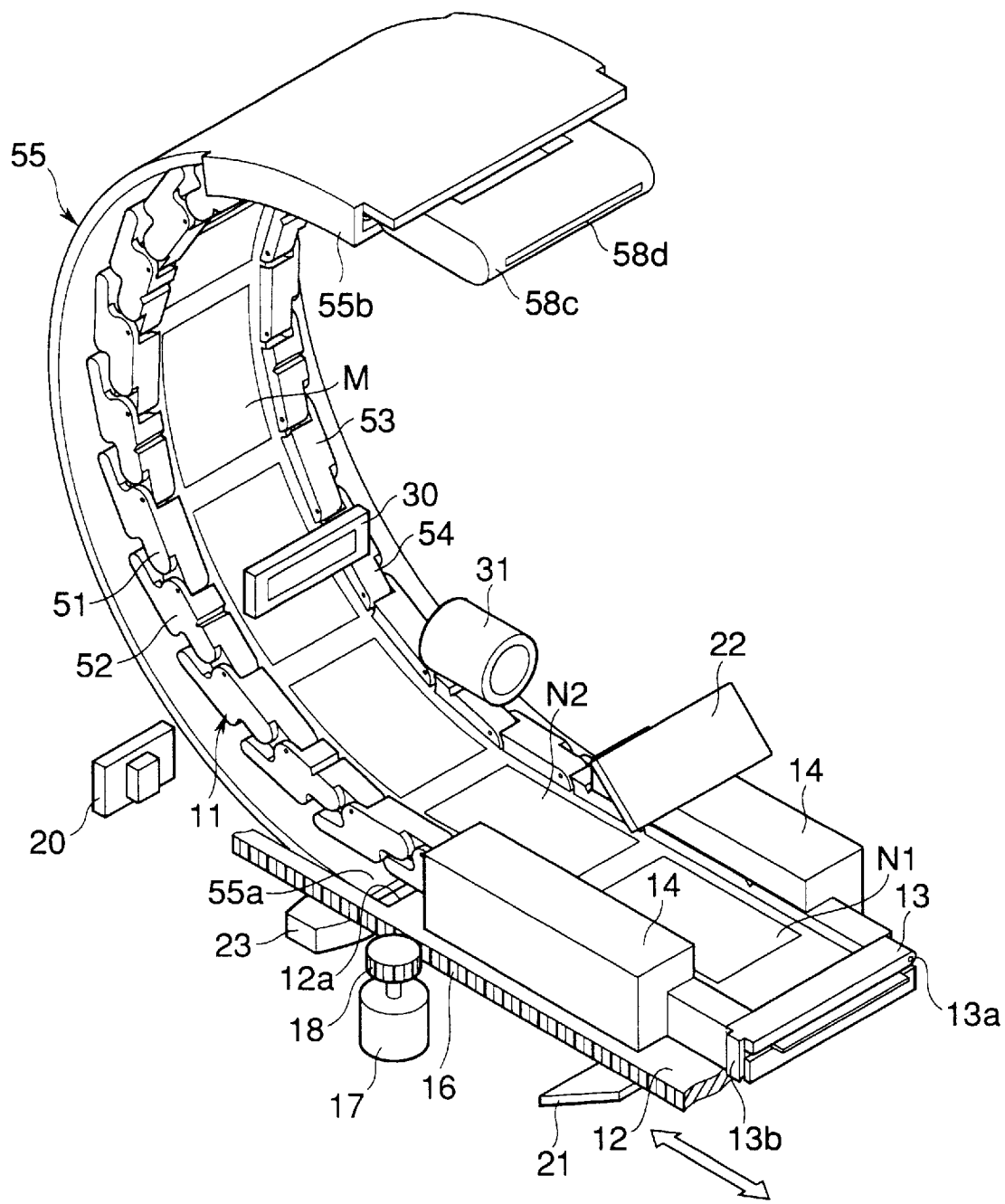
FIG. 2 is a perspective view showing the image reading device in which a film holder of the first embodiment is mounted.

FIG. 2 shows the image reading device in which a film holder 11 of the first embodiment is mounted. The film M is inserted to the film holder 11, and fixed to the film holder 11 by a clamp 13. The film holder 11 is attached to a stage 12 by a pair of fixing members 14 which are provided on the stage 12. A rack 16 is formed on a side surface of the stage 12. A pinion 18 fixed on an output shaft of a feeding motor 17 is meshed with the rack 16. The feeding motor 17, which is a stepping motor, for example, is driven under control of the system control circuit 40, so that the position of the film M is controlled.

A holder guide plate 55 is extended upward and curved in a semi-circled shape. The holder guide plate 55 is supported by a fixed frame not shown. The stage 12 has a notch 12a, the breadth of which is identical to that of the holder guide plate 55. A lower end 55a of the holder guide plate 55 is engaged with the notch 12a, in such a manner that an upper surface of the lower end 55a is approximately flush with an upper surface of the stage 12. A part of the film holder 11 is held by the fixing members 14, and a lower surface of the remaining part of the film holder 11 is supported by an inner surface of the curved holder guide plate 55, so that the film holder 11 is curved along the inner surface of the holder guide plate 55. Claws 55b are provided close to an end of the holder guide plate 55. The film holder 11 is loosely engaged with the claws 55b, so that the film holder 11 maintains the curve described by the guide plate 55, i.e. is prevented from bending further inwardly or downwardly.

In the film, six images, for example, are recorded, which are referred to as N1, N2, . . . N6 from the clamp 13 side of the film holder 11. Namely, in FIG. 2, the image N1 is positioned close to the fixing members 14, and the film holder 11 is fixed by a locating mechanism not shown. In this condition, when the feeding motor 17 is driven, the film M is moved together with the stage 12, separating the holder guide plate 55 from the notch 12a, so that the image N1 is read by the line sensor 30. Upon completion of the reading operation, the mechanism is returned to the initial state. If an image to be read is changed, the film holder 11 should be moved relative to the fixing members 14 such that the image (N2, for example) is placed at a position corresponding to the fixing members 14.

A light source 20, a condenser lens 23 and a mirror 21 are disposed below the stage 12. The condenser lens 23 and the mirror 21 are extended along lines perpendicular to a direction in which the film M is moved. A light beam radiated from the light source 20 is condensed by the condenser lens 23 and is led to the mirror 21. The light beam is reflected by the mirror 21, and radiated onto a lower surface of the film M through an opening (not shown) in the stage 12.

The line sensor 30, the forming lens 31 and a mirror 22 are disposed above the stage 12. The line sensor 30 and the mirror 22 are extended along lines perpendicular to the direction in which the film M is moved, and the line sensor 30 is placed within the arc defined by the semi-circle of the holder guide plate 55. The forming lens 31 is disposed between the line sensor 30 and the mirror 22. Therefore, when a light beam outputted from the light source 20 is radiated onto the lower surface of the film M through the condenser lens 23 and the mirror 21, the light beam passing through the film M is reflected by the mirror 22, and the image is formed on the light receiving surface of the line sensor 30 through the forming lens 31. Note that the line sensor 30, the forming lens 31 and the mirror 22 may be disposed below the stage 12, and the light source 20, the condenser lens 23 and the mirror 21 may be disposed above the stage 12.

Figure 3:
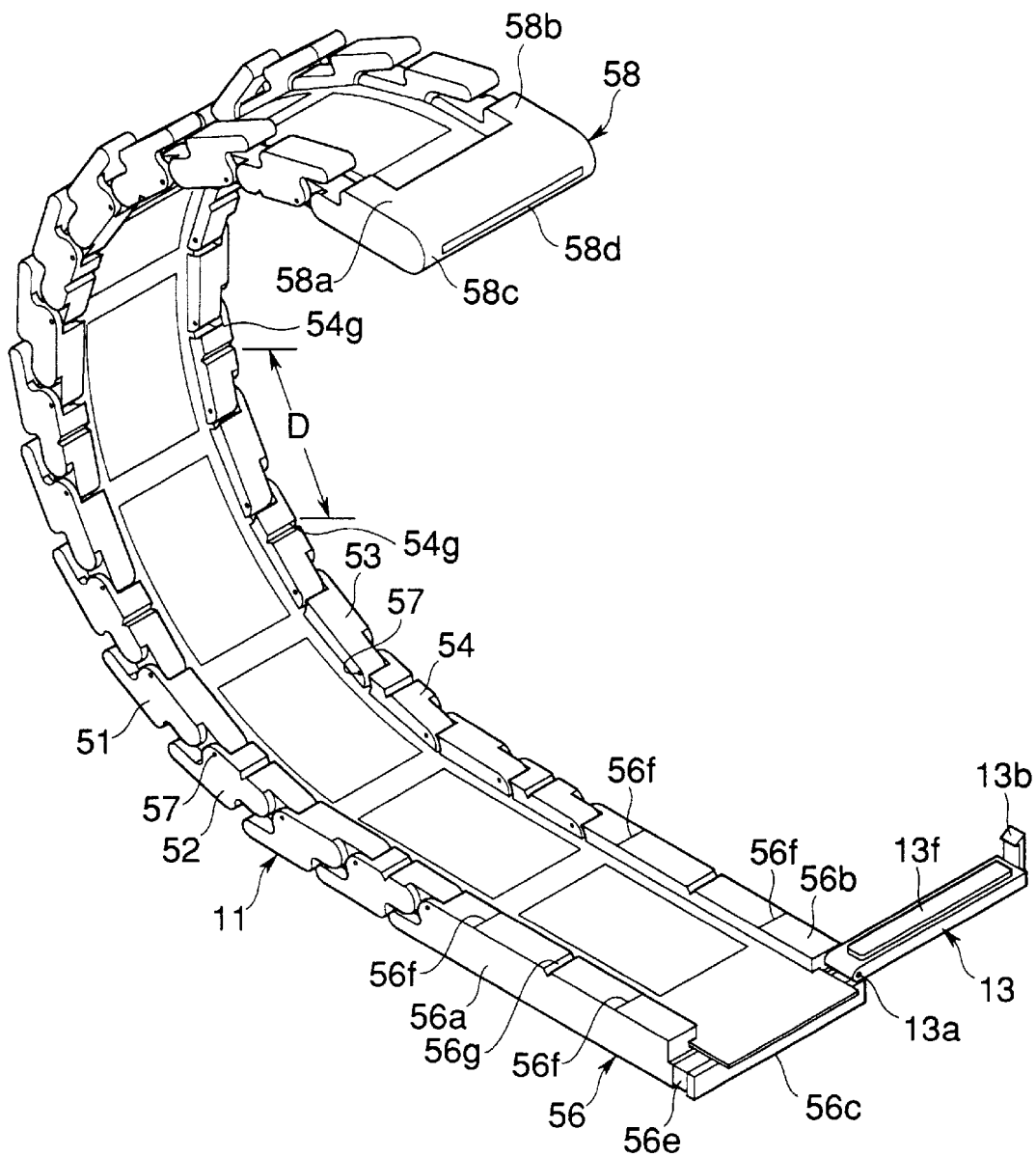
FIG. 3 is a perspective view showing the film holder of the first embodiment.

FIG. 3 shows a construction of the film holder 11 shown in FIG. 2. The film holder 11 is formed by first holder elements 51 and 53, second holder elements 52 and 54, a clamp-holder element 56 and an end-holder element 58. The first holder elements 51 and the second holder elements 52 are alternately connected. Similarly, the first holder elements 53 and the second holder elements 54 are alternately connected. The holder elements 51 and 52 are rotatably connected by a pin 57, and similarly, the holder elements 53 and 54 are rotatably connected by a pin 57.

The clamp-holder element 56 is positioned at an end of the film holder 11, being close to the stage 22, and has two holder elements 56a and 56b which are connected to each other by a clamp portion 56c. The end-holder element 58 is positioned at another end of the film holder 11, which is opposite to the clamp-holder element 56. The end-holder element 58 has two holder elements 58a and 58b which are connected by a connecting portion 58c, and a slit 58d, through which the film M can pass, is formed in the connecting portion 58c. Each of the holder elements has a film engaging groove (not shown) with which the film M can be engaged. The adjacent holder elements are pivotally connected in such a manner that the film engaging grooves are aligned with each other, so that the film M can be smoothly curved.

A clamp member 13 is rotatably supported by the clamp-holder member 56 through a pin 13a. A clamp claw 13b formed at an end of the clamp member 13 can be engaged with a recessed portion 56e formed on the clamp portion 56c. Namely, as shown in FIG. 3, the clamp member 13 is rotated while the end of the film M is positioned at the recessed portion 56e, and the clamp claw 13b is engaged with the recessed portion 56e, so that the film M is fixed by the clamp-holder element 56 (see FIG. 2). A rubber pad 13f is adhered to a lower surface of the clamp member 13, and is extended in the longitudinal direction of the clamp member 13, so that the film M is prevented from slipping and is fastened to the film holder 11.

Indexes 56f for positioning an image recorded in the film M are formed on an upper surface of the clamp-holder element 56.

Figure 4:
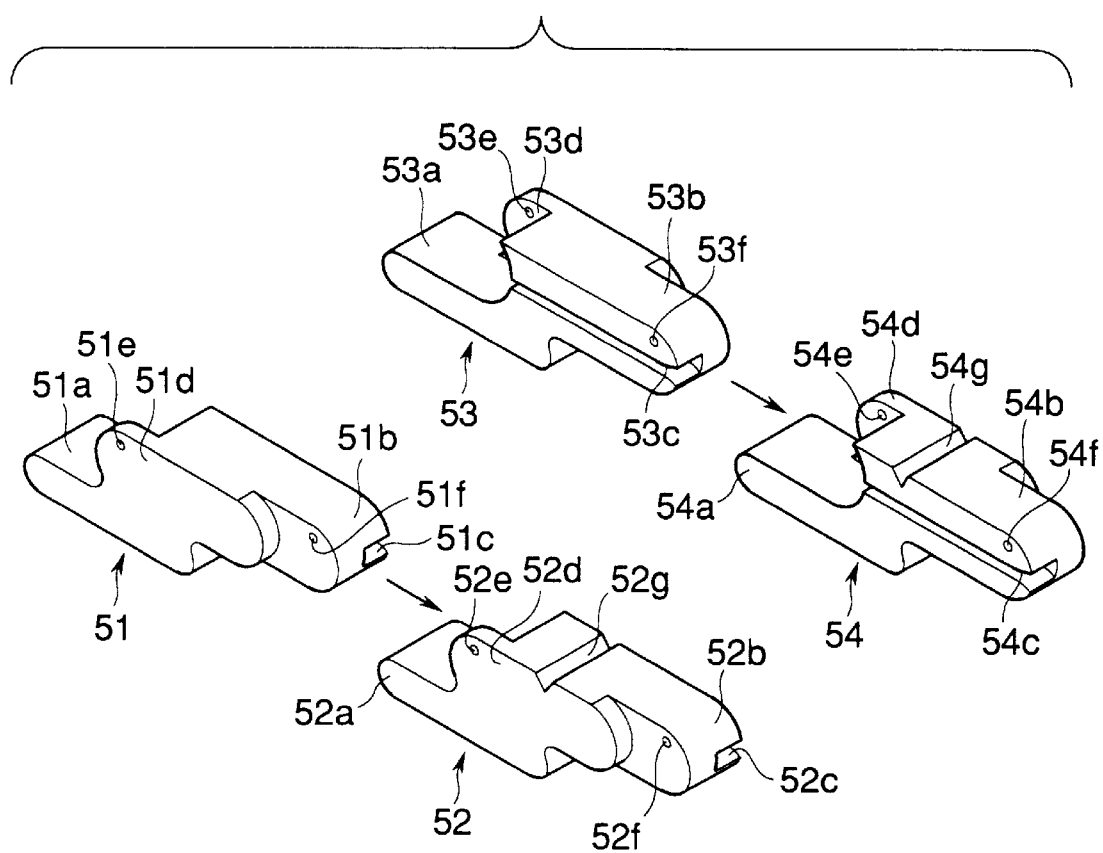
FIG. 4 is a perspective view showing first holder elements and second holder elements, of the first embodiment, in a disassembled state.

FIG. 4 shows the first holder elements 51 and 53, and the second holder elements 52 and 54, of the film holder shown in FIG. 3, in a disassembled state. In FIG. 4, each of the holder elements is shown in the same positional relationship as shown in FIGS. 2 and 3.

The holder elements 51 have a support projection 51a, which is positioned at a left side in FIG. 4, and a film engaging portion 51b, which is positioned at a right side in FIG. 4. A linear film engaging groove 51c, with which a peripheral edge of the film M can be engaged, is formed on a side surface of the film engaging groove 51c. A first connecting hole 51e is formed in a connecting flange 51d, which is formed between the support projection 51a and the film engaging portion 51b, and a second connecting hole 51f is formed in the film engaging portion 51b.

The second holder elements 52 have basically the same construction as that of the first holder element 51, except that a positioning groove 52g is formed on the upper surface of the film engaging portion 52b. Namely, the second holder elements 52 have a support projection 52a and a film engaging portion 52b, with a linear film engaging groove 52c being formed on a side surface of the film engaging portion 52b. A first connecting hole 52e is formed in a connecting flange 52d, and a second connecting hole 52f is formed in the film engaging portion 52b.

The second connecting hole 51f of the first holder elements 51 and the first connecting hole 52e of the second holder elements 52 are aligned, and the pin 57 (see FIG. 3) is inserted into the connecting holes 51f and 52e, so that the first and second holder elements 51 and 52 are rotatably connected to each other. Each of the end surfaces of the first and second holder elements 51 and 52 is formed as a cylindrical surface, such that the holder elements 51 and 52 can be rotated about the pin 57. In a state in which the holder elements 51 and 52 are connected to each other, the ends of the film engaging grooves 51c and 52c are aligned with each other. Preferably, each of the film engaging grooves 51c, 52c, 53c and 54c are formed in such manner that a breadth at the end portion, which is closest to the clamp-holder element 56, i.e. at the end portion from which the film M is inserted, is greater than the other portions.

The support projection 52a of the second holder elements 52 can only contact a lower surface of the film engaging portion 51b of one of the adjacently connected first holder elements 51, and the tip of the support projection 52a aligns with a mid portion of the film engaging portion 51b. Similarly, the support projection 51a of the first holder elements 51 can only contact lower surface of a film engaging portion 52b of one of the adjacently connected second holder elements 52, and the tip of the support projection 51a aligns with a mid portion of the film engaging portion 52b. Therefore, the first and second holder elements 51 and 52 can only be rotated in a direction whereby the support projections 51a and 52a are disposed on an outside of the semi-circle. Further, in a state in which the lower surface of the film engaging portions 51b and 52b are being contactedly supported by the support projections 51a and 52a, the film engaging grooves 51c and 52c are collinear.

The first holder elements 53 have the same construction and function as that of the first holder elements 51, except that the first holder elements 53 are a reflection of the first holder elements 51 about the longitudinal axis of the film M. In FIG. 4, each of the portions of the first holder elements 53 is indicated by a reference numeral, in which 2 is added to a reference numeral of the corresponding portion of the first holder elements 51. Similarly, the second holder elements 54 have the same construction and function as that of the second holder elements 52, except that the second holder elements 54 are a reflection of the second holder elements 52 about the longitudinal axis of the film M. In FIG. 4, each of the portions of the second holder elements 54 is indicated by a reference numeral, in which 2 is added to a reference numeral of the corresponding portion of the second holder elements 52.

A positioning member (not shown) formed on the fixing member 14 can be engaged with the positioning grooves 52g and 54g formed on the second holder elements 52 and 54, respectively, as described later, so that the film holder 11 is located at a predetermined position. The distance D (see FIG. 3) between the positioning grooves 54g, which are formed on two adjacent second holder elements 54, is the same as the distance between centers of two adjacent images recorded in the film M. This relationship is similar to that between adjacent positioning grooves 52g and the respective centers of the two adjacent images.

Figure 5:
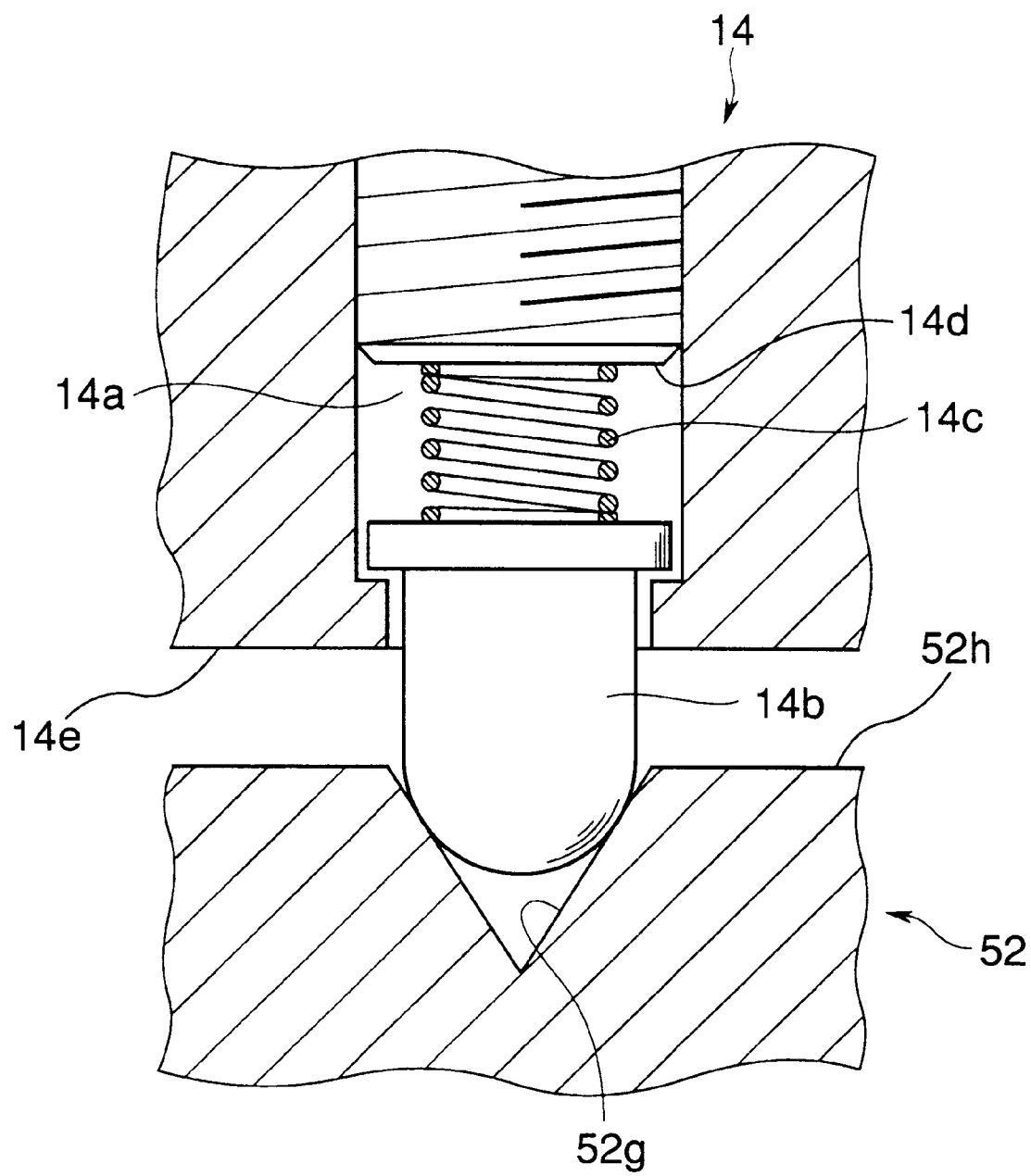
FIG. 5 is a sectional view showing a locating mechanism of the first embodiment.

FIG. 5 shows a locating mechanism between the fixing member 14 and the second holder elements 52. A chamber 14a is formed in the fixing member 14, and faces the second holder element 52. A positioning member 14b is movably provided in the chamber 14a, and a coil spring 14c is disposed between the positioning member 14b and a bottom-end face 14d of the chamber 14a, so that the positioning member 14b is urged toward the second holder element 52. Namely, the free-end face of the positioning member 14b is always projecting from the lower surface 14e of the fixing member 14.

The free-end face of the positioning member 14b can be engaged with the positioning groove 52g formed on the second holder element 52. Side walls of the positioning groove 52e are inclined so as to generally approach each other. When the positioning groove 52g does not face the positioning member 14b, the positioning member 14b resiliently abuts an upper surface 52h of the film engaging portion 52b, and the positioning member 14b is retractably positioned in the chamber 14a against the urging force of the coil spring 14c. Conversely, when the positioning groove 52g coincides with the positioning member 14b, the positioning member 14b projects downward due to the urging force of the coil spring 14c, and engages with the positioning groove 52g.

As a result, the second holder element 52 is immovably positioned with respect to a weak pushing or pulling force. Similarly, the second of the pair of fixing members 14 houses an identical locating mechanism, as that shown in FIG. 5, which operates in conjunction with the positioning groove 54g of the second holder element 54, enabling the second holder element 54 to be immovably positioned with respect to a weak pushing or pulling force. Thus, the film holder 11 is fixed at a predetermined location.

An operation in which the film M is mounted in the film holder 11 is described below.

It is supposed in this embodiment that the film holder 11 is formed slightly longer than the film M. For mounting the film M in the film holder 11, first, the clamp claw 13b is disengaged from the recessed portion 56e, and the clamp member 13 is rotated clear. Then, the film M is inserted from the clamp-holder element 56 in such a manner that the peripheral edges of the film M are engaged with the film engaging grooves 51c, 52c, 53c and 54c. In a state in which the rear end of the film M is inserted to the clamp-holder element 56 and edges of the image coincide with the indexes 56f, the clamp 13 is rotated, and the clamp claw 13b is engaged with the recessed portion 56e. Thus, the film M is fixed to the film holder 11.

Hereinafter, although reference is only made to the locating mechanism housed in fixing member 14, which is associated with positioning groove 52g, the locating mechanism disposed in the second of the fixing members 14, which is associated with positioning groove 54, follows an identical process.

When the film holder 11 is attached to the image reading device, the end-holder element 58 of the film holder 11 is inserted into the fixing member 14. Then, the film holder 11 is urged towards the holder guide plate 55 and the stage 12 with a force which is large enough for the positioning member 14b to be released from the positioning groove 52g, when the positioning member 14b is engaged with the positioning groove 52g. Thus, when the positioning member 14b is engaged with a positioning groove 56g of the clamp-holder element 56, the film holder 11 is properly positioned. In this state, the end portion of the film holder 11 is supported by the claws 55b, so that the film holder 11 is prevented from detaching from the holder guide plate 55.

As described above, in the embodiment, the film holder 11 to which the film M is attached, can be bent due to a construction by which the holder elements 51, 52, 53 and 54 are rotatably connected, and the film M is fixed to the film holder 11 by the clamp 13. Therefore, the film holder 11 can be attached to the image reading device while the film holder 11 is bent, and thus, the image reading device can be miniaturized.

Further, in the embodiment, due to the provision of the positioning grooves 52g and 54g, the film holder 11 is easily fixed at a position where an image recorded in the film M is positioned between the mirrors 21 and 22. Therefore, in a reading operation of the image, the positioning operation of the film holder 11 is easy.

Furthermore, according to the embodiment, since the film holder 11 can be curved, when the film holder 11 is removed from the image reading device and housed in a predetermined space, an elongated volume need not be provided.

Figure 6:
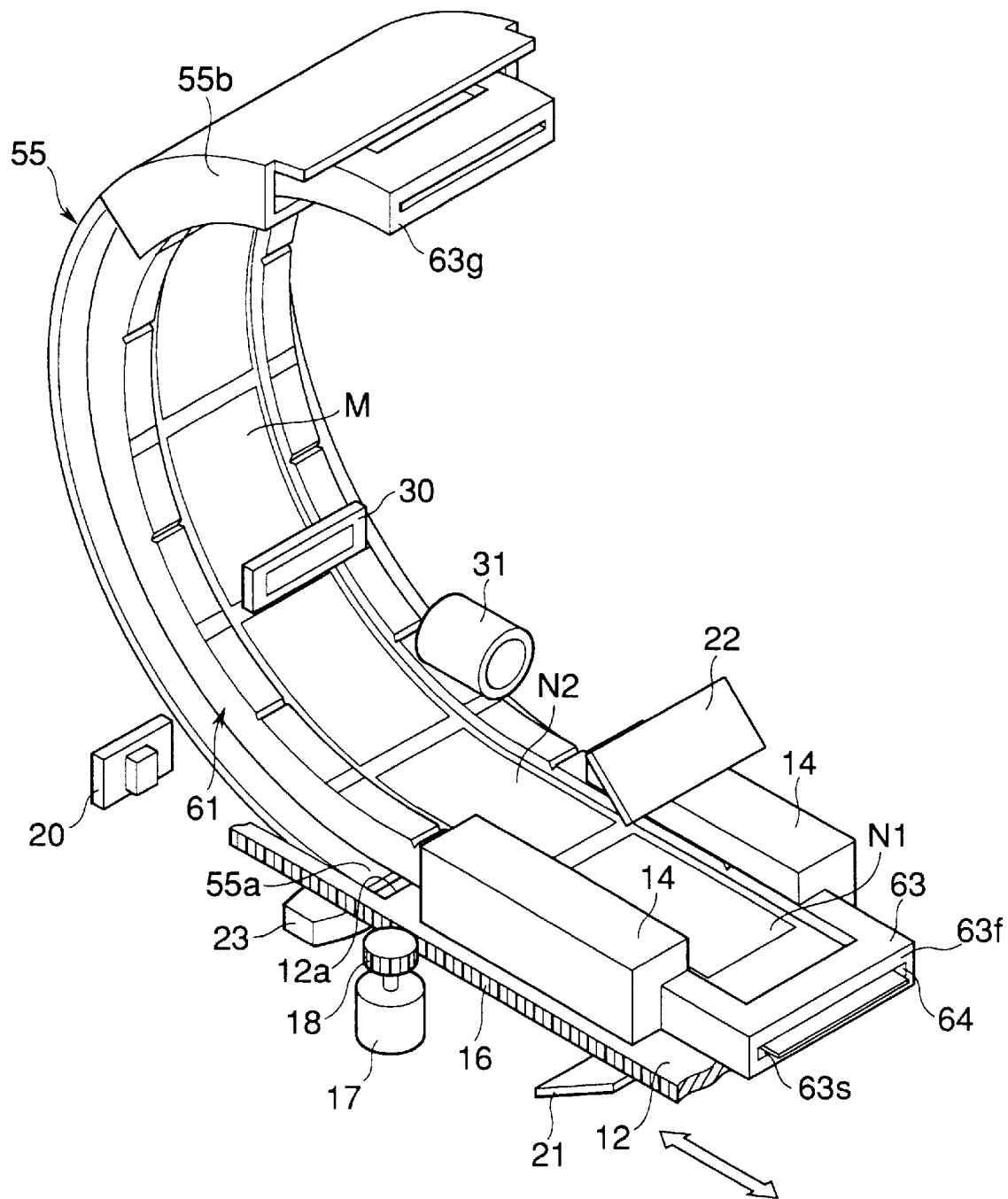
FIG. 6 is a perspective view showing an image reading device in which a film holder of the second embodiment is mounted.

FIG. 6 shows an image reading device in which a film holder 61 of the second embodiment is mounted. Structures shown in FIG. 6 are the same as those shown in FIG. 2, except for the film holder 61, which will be described below.

FIG. 7 shows the film holder 61 of the second embodiment. The film holder 61 is formed as a frame shape, and has a through-opening 62 by which the film M is exposed. At least a part of the film holder 61 is manufactured from an elastic material, such as a rubber, which will retain the original configuration. Further, at least a part of the film holder 61 should be made of an easily flexible material, which may be a rubber or a plastic, so as to be freely bent.

A film inlet 63 is provided at an end of the film holder 61, and a slit 63s, through which the film M is inserted, is formed in the film inlet 63. On peripheral edges of the opening 62, which are extended in the longitudinal direction of the film holder 61, film engaging grooves 64 are formed with which peripheral edges of the film M are engaged. The film engaging grooves 64 are extended from a front end surface 63f through a rear end surface 63g. The bottom-end face distance B between the film engaging grooves 64 gradually increases from the mid-portion of the film holder 61 towards the film inlet 63, and is constant from the mid-portion of the film holder 61 to the rear-end surface 63g.

The breadth of each of the film engaging grooves 64 is formed so as to be less than the thickness of the film M, at the film inlet 63. Accordingly, the film M is sandwiched by the film holder 61 at the film inlet 63, and thus the film inlet 63 serves as a clamp which fastens the film M. Note that an elastic member 65, such as a metal plate, may be embedded in the material of the film inlet 63.

Positioning grooves 66 are formed on an upper surface of the film holder 61 at predetermined intervals. Indexes 67 for positioning an image N1 or N2 recorded in the film M are formed on an upper surface of the film holder 61. A locating mechanism, shown in FIG. 5, provided in each of the fixing members 14, operates in conjunction with the positioning grooves 66, so that the film holder 61 can be disposed at a predetermined position.

An operation in which the film M is mounted in the film holder 61 is described below.

First, as shown in FIG. 8, both sides 63a and 63b of the film inlet 63 are pressed, so that the slit 63s opens. The distance B between of the film engaging grooves 64 is greater in the film inlet 63, and therefore, when both sides 63a and 63b are pressed, the distance B between the bottom-end faces of the film engaging grooves 64 becomes approximately constant in the longitudinal direction of the film holder 61, and approximately equals the width of the film M. Then, the film M is fed into the expanded slit 63s. When the film M has been inserted to a predetermined position, so that edges of each of the images coincide with the indexes 67, the film inlet 63 is closed by removal of the pressing forces, and thus the film M is clamped in the film holder 61.

When the film holder 61 is attached to the image reading device, the portion including the rear end surface 63g of the film holder 61 is inserted into the fixing members 14. Then, the film holder 11 is push towards the holder guide plate 55, in a similar way as the first embodiment. Thus, the film holder 61 is fixed at a predetermined position.

As described above, at least a part of the film holder 61 is made of a flexible material, so that the film holder 61 can be curved, and the film M is fixed in the film holder 61 due to an elastic force at the film inlet 63. Further, since the positioning grooves 66 are formed on the upper surface of the film holder 61, in comparison with a film holder having no positioning grooves, the film holder 61 can be bent smoothly, and the film holder 61 can be deformed in the breadth direction to accommodate curvature. Therefore, the film holder 61 can be mounted on the image reading device in a curved state, so that the size of the image reading device can be reduced.

Further, when the film holder 61 is made of a rubber, a reliable positioning is performed in association with a pin provided in a locating mechanism (not shown). The pin may also be made of a rubber.

In addition to the effects described above, according to the second embodiment, the same effects as those described in the first embodiment can be obtained.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application Nos. 9-161900 and 9-161901 (filed on Jun. 4, 1997) which are expressly incorporated by reference, in their entirety.

I claim:

1. A film holder by which a film is held, comprising:
a plurality of holding elements, each of which includes a film engaging groove with which a peripheral edge of said film can be engaged; and
a connecting mechanism that pivotally connects said holding elements, which are adjacent to each other, in such a manner that, when said plurality of holding elements are pivoted, said film engaging grooves maintain a curvilinear alignment.

2. A film holder according to claim 1, wherein said plurality of holding elements are pivotable only in one rotational direction.

3. A film holder according to claim 1, further comprising a clamp member fixing said film at a predetermined position of said film holder.

4. A film holder according to claim 3, wherein said clamp member is attached to one of said plurality of holding elements, which is provided at an end of said film holder.

5. A film holder according to claim 1, wherein each of said plurality of holding elements is provided with a projection that contacts one of said adjacent holding elements, at which time said film engaging grooves are collinear.

6. A film holder according to claim 1, wherein said film engaging grooves are formed in such a manner that a breadth of said film engaging grooves is greater in an end portion, through which said film is inserted, than in the other portions.

7. A film holder according to claim 1, wherein each alternate holding element of said plurality of holding elements has a recessed portion with which a positioning member, provided in an image reading device in which said film holder is mounted, is engagable.

8. A film holder by which a film is held, comprising:
   a holding member having an opening, through which said film is exposed, and a pair of film engaging grooves, with which peripheral edges of said film can be engaged, at least a part of said holding member being formed from a flexible material.

9. A film holder according to claim 8, wherein said flexible material is an elastic material.

10. A film holder according to claim 9, wherein said elastic material is a rubber.

11. A film holder according to claim 8, wherein said film holder is provided with a film inlet at an end thereof, through which said film is inserted.

12. A film holder according to claim 11, wherein said film inlet holds said film.

13. A film holder according to claim 12, further comprising an elastic member provided in said film inlet.

14. A film holder according to claim 11, wherein said film engaging grooves are formed in such a manner that a bottom-end face distance between said film engaging grooves increases as said film inlet approaches.

15. A film holder according to claim 8, wherein said film holder comprises at least one recessed portion engagable with a positioning member provided in an image reading device, in which said film holder is mounted.

16. An image reading device comprising:
   a holder guide that supports a film holder, in which a film is mounted, in such a manner that said film holder is curved;
   an illumination optical system that radiates a light beam onto said film; and
   a reading optical system that reads an image recorded in said film, which is illuminated by said illumination optical system, one of said illumination optical system and said reading optical system being provided in a portion in which the center of curvature of said holder guide is positioned.

17. A device according to claim 16, further comprising a stage that supports said film holder together with said holder guide.

18. A device according to claim 17, wherein said stage is provided with at least one fixing member to fix said film holder at a predetermined position.

19. A device according to claim 16, wherein said holder guide is provided with at least one claw at a position close to an end of said holder guide.

* * * * *